United States Patent
Mochida et al.

(10) Patent No.: US 7,007,138 B2
(45) Date of Patent: Feb. 28, 2006

(54) APPARATUS, METHOD, AND COMPUTER PROGRAM FOR RESOURCE REQUEST ARBITRATION

(75) Inventors: Tetsuji Mochida, Katano (JP); Kosuke Yoshioka, Daito (JP); Tokuzo Kiyohara, Osaka (JP)

(73) Assignee: Matsushita Electric Industiral Co., Ltd., Osaka-fu (JP)

(*) Notice: Subject to any disclaimer, the term of this patent is extended or adjusted under 35 U.S.C. 154(b) by 326 days.

(21) Appl. No.: 10/413,758

(22) Filed: Apr. 15, 2003

(65) Prior Publication Data

US 2004/0019749 A1    Jan. 29, 2004

(30) Foreign Application Priority Data

Apr. 17, 2002 (JP) ............................. 2002-114550

(51) Int. Cl.
*G06F 13/16* (2006.01)

(52) U.S. Cl. .................................................. 711/151

(58) Field of Classification Search ............... 711/150, 711/151; 710/36, 45, 111, 117, 240, 244
See application file for complete search history.

(56) References Cited

U.S. PATENT DOCUMENTS

| | | | | |
|---|---|---|---|---|
| 4,949,247 A | * | 8/1990 | Stephenson et al. | 712/6 |
| 4,969,120 A | * | 11/1990 | Azevedo et al. | 710/117 |
| 5,072,363 A | * | 12/1991 | Gallagher | 710/241 |
| 5,430,848 A | * | 7/1995 | Waggener | 710/123 |
| 5,894,586 A | * | 4/1999 | Marks et al. | 710/28 |
| 6,205,524 B1 | * | 3/2001 | Ng | 711/151 |
| 6,240,475 B1 | * | 5/2001 | Anubolu | 710/107 |
| 6,868,486 B1 | * | 3/2005 | Ward | 711/158 |

FOREIGN PATENT DOCUMENTS

JP         10-289203         10/1998

* cited by examiner

*Primary Examiner*—Kevin L. Ellis

(57) ABSTRACT

In a resource request arbitration apparatus according to the present invention, a request masking unit masks a memory access request REQ that is issued by a resource requesting device at over a minimum frequency needed for the resource requesting device, and an arbitrating unit acknowledges one of the memory access requests RREQ that are not suspended by the request masking unit, based on a predetermined static order of priority. With this resource request arbitration apparatus, the arbitrating unit do not have to concern anything other than the predetermined priority order among the memory access requesting units, and an easy and plain arbitration system based on the static priority order ensures the minimum frequency for acknowledging the resource requests that each memory access requesting unit needs.

21 Claims, 11 Drawing Sheets

APPARATUS, METHOD, AND COMPUTER PROGRAM FOR RESOURCE REQUEST ARBITRATION

BACKGROUND OF THE INVENTION (1) Field of the Invention

The present invention relates to an apparatus and a method for resource request arbitration, and more specifically, it relates to a technique to control service qualities for each of a plurality of resource requesting devices that are subject to arbitration.

(2) Description of the Related Art

An information processor that is structured so as to enable a plurality of resource requesting devices to access to a shared resource such as a bus and a unified memory has been known. Each resource requesting device in the information processor issues a resource request as needed in order to access the shared resource, without concerning the status of the other resource requesting devices. The information processor prevents an access conflict to the shared resource between more than one resource requesting device by a process called arbitration for acknowledging one of the resource requesting devices when more than one resource request is issued almost at the same time.

The arbitration is easily realized by setting a static priority for each of the plurality of resource requesting devices, and acknowledging a resource request that is issued by a resource requesting device with the highest priority. A technique called a round-robin arbitration is also known, which ensures the fairness among the resource requesting devices by rotating the priority order.

Further, in a case of a resource requesting device that processes data such as moving images, which requires a high degree of real-time processing, an effective control of the service qualities, indicated by such as the data transfer rate and the maximum waiting time, have been demanded, in addition to the fairness.

An arbitrating device disclosed in Japanese Laid-Open Patent Application No. H10-289203 is made in an attempt to respond to such demands. The arbitrating device of H10-289203 controls the service qualities in a manner that the arbitrating device compares an actual amount of transfer data and an amount of data to-be-transferred for each of the resource requesting devices that are subject to arbitration, and when the data transfer of one of the resource requesting devices is smaller than the amount of data to-be-transferred, and the data transfer of another of the resource requesting devices is larger than the amount of data to-be-transferred, the arbitrating device acknowledges the resource request issued by the former device.

By using the technique disclosed in H10-289203, the arbitrating device compares and judges a status of each resource requesting device, and re-arranges the priority order dynamically in order to control the service qualities. Therefore, a problem has been noted that, when the number of resource requesting devices that are subject to arbitration increases, the processing according to the arbitration technique disclosed in H10-289203 becomes drastically complicated as the number of combination of the devices issuing requests increases.

SUMMARY OF THE INVENTION

An object of the present invention is to solve the above noted problem, and aims to provide an apparatus, a method, and a program for resource request arbitration that controls the service qualities for each resource requesting device based on a predetermined static priority order, without concerning a relation among resource requesting devices other than said priority order.

(1) An apparatus for resource request arbitration according to the present invention is the apparatus for resource request arbitration that arbitrates a plurality of resource requests issued by a plurality of resource requesting devices by acknowledging one of the plurality of resource requests in every time-slot, the plurality of resource requesting devices being in a predetermined priority order, the apparatus for resource request arbitration comprising: a suspending unit operable to suspend a resource request issued by a resource requesting device when R resource requests issued by the resource requesting device have already been acknowledged during preceding S time-slots, R and S being numbers set to each of the plurality of resource requesting devices separately in advance; and an acknowledging unit operable to acknowledge a resource request selected from the resource requests that are not suspended by the suspending unit, the selected resource request being issued by a resource requesting device having a highest priority among the plurality of resource requesting devices which have issued the resource requests that are not suspended.

According to the above construction, the suspending unit suspends the resource requests that are issued over a minimum frequency needed to each resource requesting device, and the acknowledging unit acknowledges, based on a predetermined priority order, one of the resource requests that are not suspended by the suspending unit, and the minimum frequency for acknowledging the resource requests that each resource requesting device needs is ensured without concerning the relationship among the resource requesting devices other than the priority order.

(2) Further, the above described apparatus for resource request arbitration can also be such that, when the suspending unit suspends all of the resource requests issued by the plurality of resource requesting devices, the acknowledging unit acknowledges one of the suspended resource requests that is issued by a resource requesting device having a highest priority among the plurality of resource requesting devices that have issued the resource requests.

According to the above construction, the acknowledging unit acknowledges one of the resource requests, when all of the resource request are suspended, and therefore, it is possible to avoid the reduce in resource utilization.

(3) In addition, the apparatus for resource request arbitration described in (1) can also be the apparatus for resource request arbitration, wherein the suspending unit includes a plurality of sets of a parameter storing unit and a masking signal issuing unit, each set corresponding to a different one of the plurality of resource requesting devices, the parameter storing unit storing a number M, the masking signal issuing unit issuing a masking signal during M time-slots succeeding to a time-slot in which the resource request issued by the corresponding resource requesting device is acknowledged, and the suspending unit suspends the resource request that the corresponding resource requesting device issues at a second time and later, using the masking signal, during (M+1) successive time-slots. Further, the apparatus for resource request arbitration described in (1) can also be an apparatus for resource request arbitration, wherein the suspending unit includes a plurality of sets of a parameter storing unit and a masking signal issuing unit, each set corresponding to a different one of the plurality of resource requesting devices, the parameter storing unit storing a number M and a number N, the masking signal issuing unit issuing a masking signal in every time-slot after M resource requests that are issued by the corresponding resource requesting device have been acknowledged within N successive time-slots, and wherein the suspending unit suspends the resource request that the corresponding resource requesting device issues the resource request at Mth time and later, using the masking signals, during N successive time-slots. The apparatus for resource request arbitration described in (1) can also be the apparatus for resource request arbitration, wherein the suspending unit includes a plurality of sets of a parameter storing unit and a masking signal issuing unit, each set corresponding to a different one of the plurality of resource requesting devices, the parameter storing unit storing a number M, the masking signal issuing unit issuing a masking signal in one succeeding time-slot after M resource requests that are issued by the corresponding resource requesting device have been acknowledged within successive time-slots, and wherein the suspending unit suspends a (M+1)th resource request issued by the corresponding resource requesting device during (M+1) successive time-slots using the masking signal.

According to the above construction, it is possible to set an acknowledging frequency to be ensured for each resource requesting unit according to values of each parameter.

(4) Moreover, the apparatus for resource request arbitration described in (1) can be the apparatus for resource request arbitration, wherein the suspending unit includes a plurality of sets of a parameter storing unit and a masking signal issuing unit, each set corresponding to a different one of the plurality of resource requesting devices, the parameter storing unit storing a number K the masking signal issuing unit issuing a masking signal every time slot during time-slots, in which all of K resource requests that have been issued by the corresponding resource requesting device and have been acknowledged are yet to be executed, and wherein the suspending unit suspends the resource requests that the corresponding resource requesting device issues at a Kth time and later, using the masking signals, during the time-slots in which the K acknowledged resource requests are yet to be executed.

According to the above construction, a maximum number of resource requests that are ready and waiting are controlled per resource requesting unit, and therefore, a maximum waiting time for execution is ensured.

(5) The apparatus for resource request arbitration described in (1) may further includes a resource request splitting unit operable to split the resource request that requests a resource exceeding a predetermined amount and is issued by a resource requesting device into a plurality of split resource requests each requesting the resource of the predetermined amount or smaller, wherein the suspending unit suspends the resource request and the split resource request issued by and originated from the resource requesting devices when total R of resource requests and split resource requests that are issued by and originated from the resource requesting device have already been acknowledged during preceding S time-slots, and the acknowledging unit acknowledges a resource request and a split resource request that are not suspended by the suspending unit, the resource request or the acknowledged split resource request to be acknowledged being issued by or originated from a resource requesting device having a highest priority among the plurality of resource requesting devices which have issued the resource requests and the split resource requests that are not suspended.

According to the above construction, a time length for resource utilization based on each resource request is reduced, and therefore, the maximum waiting time for execution is shortened.

(6) A method for resource request arbitration according to the present invention is a method for resource request arbitration that arbitrates a plurality of resource requests issued by a plurality of resource requesting devices by acknowledging one of the plurality of resource requests in every time-slot, the plurality of resource requesting devices being in a predetermined priority order, the method for resource request arbitration comprising: a suspending step for suspending a resource request issued by a resource requesting device when R resource requests issued by the resource requesting device have already been acknowledged during preceding S time-slots, R and S being numbers set to each of the plurality of resource requesting devices separately in advance; and an acknowledging step for acknowledging a resource request selected from the resource requests that are not suspended in the suspending step, the selected resource request being issued by a resource requesting device having a highest priority among the plurality of resource requesting devices which have issued the resource requests that are not suspended.

According to the above construction, the same effect as explained in (1) is achieved.

(7) Further, the method for resource request arbitration described in (6) can be such that, when all of the resource requests issued by the plurality of resource requesting devices is suspended in the suspending step, one of the suspended resource requests that is issued by a resource requesting device having a highest priority among the plurality of resource requesting devices that have issued the resource requests is acknowledged in the acknowledging step.

According to the above construction, the same effect as explained in (2) is achieved.

(8) Moreover, the method for resource request arbitration described in (6) can also be a method for resource request arbitration, wherein the suspending step includes a plurality of sets of a parameter storing substep and a masking signal issuing substep, each set corresponding to a different one of the plurality of resource requesting devices, the parameter obtaining substep for obtaining a number M, the masking signal issuing substep for issuing a masking signal during M time-slots succeeding to a time-slot in which the resource request issued by the corresponding resource requesting device is acknowledged, and wherein the resource request that the corresponding resource requesting device issues at a second time and later during (M+1) successive time-slots is suspended in the suspending step, using the masking signal. In addition, the method for resource request arbitration described in (6) can also be a method for resource request arbitration, wherein the suspending step includes a plurality of sets of a parameter storing substep and a masking signal issuing substep, each set corresponding to a different one of the plurality of resource requesting devices, the parameter obtaining substep for obtaining a number M and a number N, the masking signal issuing subsep for issuing a masking signal in every time-slot after M resource requests that are issued by the corresponding resource requesting device have been acknowledged within N successive time-slots, and wherein the resource request that the corresponding resource requesting device issues the resource request at Mth time and later during N successive time-slots is suspended in the suspending unit, using the masking signals. Furhter, the method for resource request arbitration described in (6) can also be a method for resource request arbitration, wherein the suspending step includes a plurality of sets of a parameter storing substep and a masking signal issuing substep, each set corresponding to a different one of the plurality of resource requesting devices, the parameter obtaining substep for obtaining a number M, the masking signal issuing step for issuing a masking signal in one succeeding time-slot after M resource requests that are issued by the corresponding resource requesting device have been acknowledged within successive time-slots, and wherein a (M+1)th resource request issued by the corresponding resource requesting device during (M+1) successive time-slots is suspended in the suspending step using the masking signal.

According to the above construction, the same effect as explained in (3) is achieved.

(9) The method for resource request arbitration described in (6) can also be a method for resource request arbitration, wherein the suspending step includes a plurality of sets of a parameter storing substep and a masking signal issuing substep, each set corresponding to a different one of the plurality of resource requesting devices, the parameter obtaining substep for obtaining a number K, the masking signal issuing unit issuing a masking signal every time slot during time-slots, in which all of K resource requests that have been issued by the corresponding resource requesting device and have been acknowledged are yet to be executed, and wherein the suspending unit suspends the resource requests that the corresponding resource requesting device issues at a Kth time and later, using the masking signals, during the time-slots in which the K acknowledged resource requests are yet to be executed.

According to the above construction, the same effect as explained in (4) is achieved.

(10) The method for resource request arbitration described in (6) may further includes a resource request splitting step for splitting the resource request that requests a resource exceeding a predetermined amount and is issued by a resource requesting device into a plurality of split resource requests each requesting the resource of the predetermined amount or smaller, wherein the suspending step for suspending the resource request and the split resource request issued by and originated from the resource requesting devices when total R of resource requests and split resource requests that are issued by and originated from the resource requesting device have already been acknowledged during preceding S time-slots, and the acknowledging step for acknowledging a resource request and a split resource request that are not suspended in the suspending step, the resource request or the acknowledged split resource request to be acknowledged being issued by or originated from a resource requesting device having a highest priority among the plurality of resource requesting devices which have issued the resource requests and the split resource requests that are not suspended.

According to the above construction, the same effect as explained in (5) is achieved.

(11) A computer executable program for resource request arbitration according to the present invention is a computer executable program for executing a method for resource request arbitration that arbitrates a plurality of resource requests issued by a plurality of resource requesting devices by acknowledging one of the plurality of resource requests in every time-slot, the plurality of resource requesting devices being in a predetermined priority order, the computer executable program executing: a suspending step for suspending a resource request issued by a resource requesting device when R resource requests issued by the resource requesting device have already been acknowledged during preceding S time-slots, R and S being numbers set to each of the plurality of resource requesting devices separately in advance; and an acknowledging step for acknowledging a resource request selected from the resource requests that are not suspended in the suspending step, the selected resource request being issued by a resource requesting device having a highest priority among the plurality of resource requesting devices which have issued the resource requests that are not suspended.

According to the above construction, the same effect as explained in (1) is achieved.

(12) Further, the above computer executable program for resource request arbitration can be such that, when all of the resource requests issued by the plurality of resource requesting devices is suspended in the suspending step, one of the suspended resource requests that is issued by a resource requesting device having a highest priority among the plurality of resource requesting devices that have issued the resource requests is acknowledged in the acknowledging step.

According to the above construction, the same effect as explained in (2) is achieved.

(13) Moreover, the computer executable program for resource request arbitration described in (11) can be a computer executable program for resource request arbitration described in (11), wherein the suspending step includes a plurality of sets of a parameter storing substep and a masking signal issuing substep executed by a computer, each set corresponding to a different one of the plurality of resource requesting devices, the parameter obtaining substep for obtaining a number M, the masking signal issuing substep for issuing a masking signal during M time-slots succeeding to a time-slot in which the resource request issued by the corresponding resource requesting device is acknowledged, and wherein the resource request that the corresponding resource requesting device issues at a second time and later during (M+1) successive time-slots is suspended in the suspending step, using the masking signal. In addition, the computer executable program for resource request arbitration described in (11) can be a computer executable program for resource request arbitration, wherein the suspending step includes a plurality of sets of a parameter storing substep and a masking signal issuing substep executed by a computer, each set corresponding to a different one of the plurality of resource requesting devices, the parameter obtaining substep for obtaining a number M and a number N, the masking signal issuing subsep for issuing a masking signal in every time-slot after M resource requests that are issued by the corresponding resource requesting device have been acknowledged within N successive time-slots, and wherein the resource request that the corresponding resource requesting device issues the resource request at Mth time and later during N successive time-slots is suspended in the suspending unit, using the masking signals. The computer executable program for resource request arbitration described in (11) can also be a computer executable program for resource request arbitration wherein the suspending step includes a plurality of sets of a parameter storing substep and a masking signal issuing substep executed by a computer, each set corresponding to a different one of the plurality of resource requesting devices, the parameter obtaining substep for obtaining a number M, the masking signal issuing step for issuing a masking signal in one succeeding time-slot after M resource requests that are issued by the corresponding resource requesting device have been acknowledged within successive time-slots, and wherein a (M+1)th resource request issued by the corresponding resource requesting device during (M+1) successive time-slots is suspended in the suspending step using the masking signal.

According to the above construction, the same effect as explained in (3) is achieved.

(14) Moreover, the computer executable program for resource request arbitration described in (1) can be a computer executable program for resource request arbitration, wherein the suspending step includes a plurality of sets of a parameter storing substep and a masking signal issuing substep executed by a computer, each set corresponding to a different one of the plurality of resource requesting devices, the masking signal issuing unit issuing a masking signal every time slot during time-slots, in which all of K resource requests that have been issued by the corresponding resource requesting device and have been acknowledged are yet to be executed, and wherein the suspending unit suspends the resource requests that the corresponding resource requesting device issues at a Kth time and later, using the masking signals, during the time-slots in which the K acknowledged resource requests are yet to be executed.

According to the above construction, the same effect as explained in (4) is achieved.

(15) The computer executable program for resource request arbitration described in (1) may further executes: a resource request splitting step for splitting the resource request that requests a resource exceeding a predetermined amount and is issued by a resource requesting device into a plurality of split resource requests each requesting the resource of the predetermined amount or smaller, wherein the suspending step for suspending the resource request and the split resource request issued by and originated from the resource requesting devices when total R of resource requests and split resource requests that are issued by and originated from the resource requesting device have already been acknowledged during preceding S time-slots, and the acknowledging step for acknowledging a resource request and a split resource request that are not suspended in the suspending step, the resource request or the acknowledged split resource request to be acknowledged being issued by or originated from a resource requesting device having a highest priority among the plurality of resource requesting devices which have issued the resource requests and the split resource requests that are not suspended.

According to the above construction, the same effect as explained in (5) is achieved.

BRIEF DESCRIPTION OF THE DRAWINGS

These and the other objects, advantages and features of the invention will become apparent from the following description thereof taken in conjunction with the accompanying drawings which illustrate a specific embodiment of the invention.

In the drawings.

DESCRIPTION OF THE PREFERRED EMBODIMENT

The following describes apparatuses, methods, and computer programs for resource request arbitration according to preferred embodiments of the present invention.

First Embodiment

A resource request arbitration apparatus according to a first embodiment periodically arbitrates resource requests issued by each of a plurality of resource requesting devices that are in a priority order in advance. The resource requesting devices issue the requests as needed without concerning status of other resource requesting devices. The resource request arbitration apparatus suspends a resource request issued by a resource requesting device when R resource requests issued by the resource requesting device have already been acknowledged during preceding S time-slots. R and S are numbers set to each of the plurality of resource requesting devices separately in advance. In other words, the resource request arbitration apparatus masks the resource request issued by the resource requesting device when the resource request is issued at a R time and later within S time-slots. Then the resource request arbitration apparatus acknowledges one of resource requests that is not masked based statically on the predetermined priority set for the plurality of resource requesting devices.

In the first embodiment, an explanation about the resource request arbitration apparatus that arbitrates memory access requests for the shared memory is given taking a shared memory as an example of the resource. Examples of the memory access requests include a data transfer command indicating a source address, a destination address, and a number of data bytes to be transferred.

The resource request arbitration apparatus of the present embodiment is detailed below in reference to the drawings.

[Entire Construction]

Figure 1:
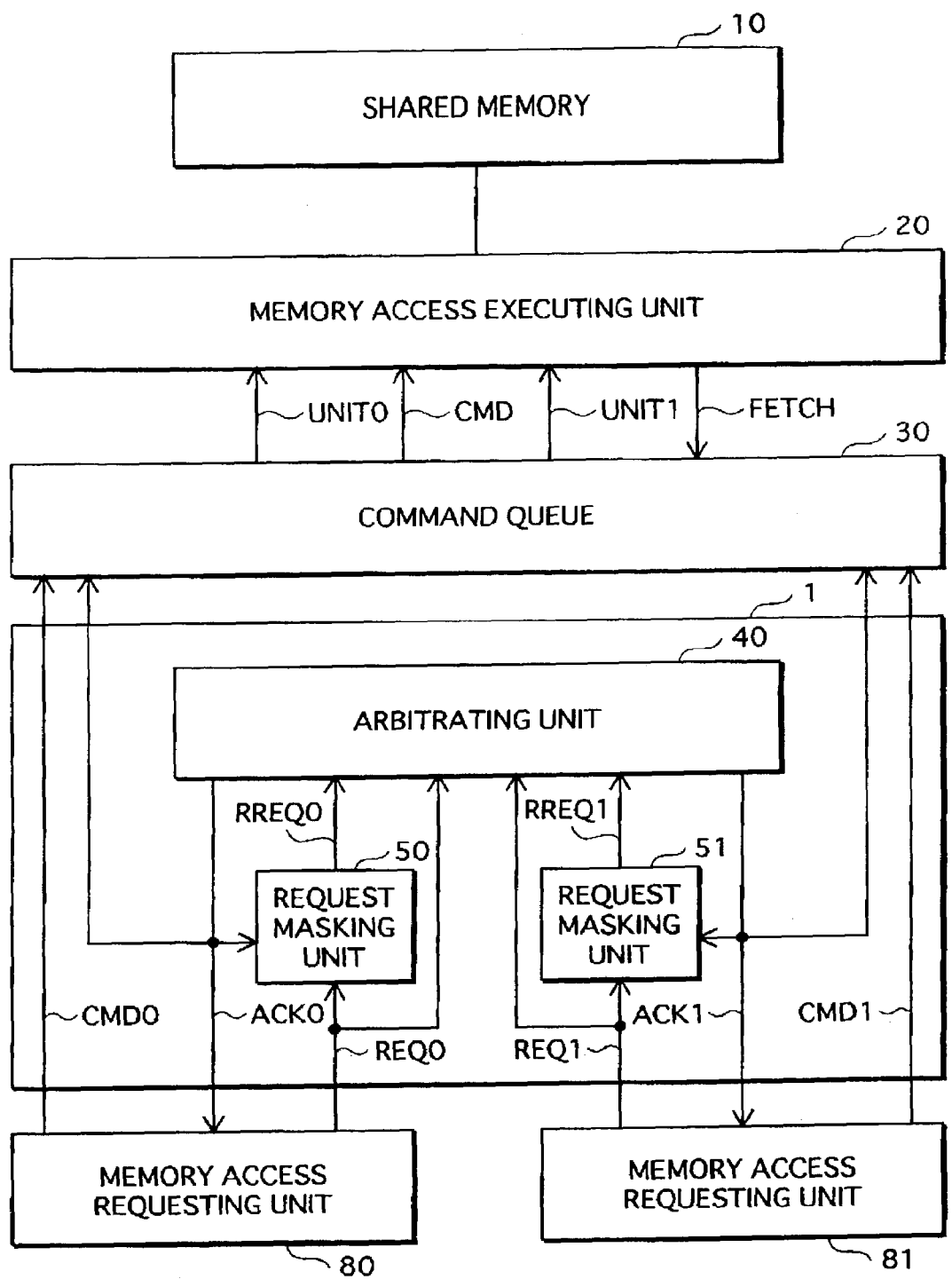
FIG. 1 is a functional block diagram of a resource requesting arbitration apparatus.

FIG. 1 is a functional block diagram illustrating a construction of a resource request arbitration apparatus 1 according to the first embodiment. In this drawing, memory access requesting units 80 and 81, a command queue 30, a memory access executing unit 20, and a shared memory 10 are shown, in addition to the resource request arbitration apparatus 1.

The resource request arbitrating apparatus 1 comprises request masking units 50 and 51, and an arbitrating unit 40. The request masking units 50 and 51 correspond to the memory access requesting units 80 and 81, respectively.

Specifically, the resource request arbitrating apparatus 1 can be made of a processor, a Read-Only-Memory (ROM) that stores a program, and the like, and functions of each of the units can be realized by the processor executing the program stored in the ROM. The resource request arbitrating apparatus 1 can also be a hardware circuit, such as a wired logic and a ASIC (Application Specific Integrated Circuit), that realizes the functions of each of the units.

The memory access requesting units 80 and 81, respectively, issue memory accessing commands CMD0 and CMD1 as needed, and assert memory access requesting signal REC0 and REC1, each indicating that a valid access command has been issued.

The resource request arbitrating apparatus 1 cyclically processes to assert an acknowledging signal ACK0 or ACK1. The cycle is indicated by arbitrating clock signal that is not shown in the drawing, and the resource request arbitrating apparatus 1 works being synchronized with the arbitrating clock signal. One cycle of the arbitrating clock signal is hereinafter referred to as one time-slot.

The command queue 30 stores one of the memory access commands CMD0 and CMD1 that is indicated by either of the acknowledging signals ACK0 and ACK1, and the acknowledging signals ACK0 and ACK1 in an order of being acknowledged.

The memory access executing unit 20 asserts a fetching signal FETCH, and fetches an oldest memory access command, the acknowledging signal ACK0, and the acknowledging signal ACK1 that are stored in the command queue 30, each as the memory access command CMD, a source identifying signal UNIT0, and a source identifying signal UNIT1, and then executes the fetched memory access command CMD.

Figure 2:
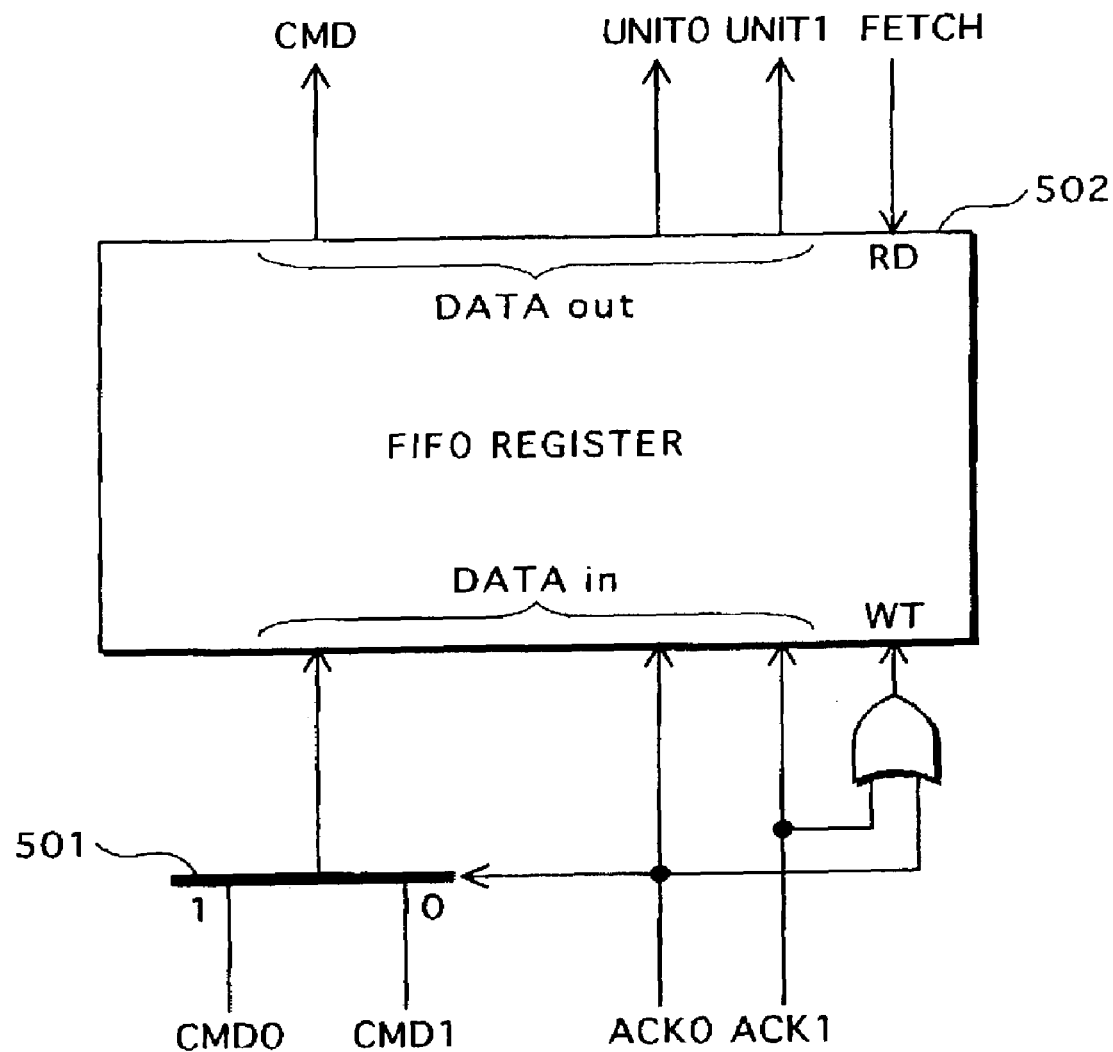
FIG. 2 is a functional block diagram of a command queue.

FIG. 2 is a functional block diagram illustrating a construction of the command queue 30. The command queue 30 comprises a selector 501 and a FIFO register 502. When the acknowledging signal ACK0 or ACK1 is asserted, the FIFO register 502 records the acknowledging signal ACK0 and ACK1, along with one of the memory access command CMD0 and CMD1 that is selected by the selector 501. The acknowledging signals ACK0 and ACK1 are read out as the source identifying signals UNIT0 and UNIT1, which identifies the memory access requesting unit that has issued the memory access command.

[Detailed Construction of Request Masking Unit 50]

The request masking unit 50 transmits a memory access requesting signal REQ0 as a gated requesting signal RREQ0 until a Rth time during the S time-slots set for the memory access requesting unit 80. However, the memory access requesting signals REQ0 is masked when the REQ0 is issued exceeding the predetermined times within the time-slots set for the memory access requesting unit 80, and the request masking unit 50 does not transmit the REQ0 as the gated requesting signal RREQ0.

A request masking unit 51 performs the same processing on the memory access requesting signals REQ1 that is issued by the memory access requesting unit 81.

Figure 3:
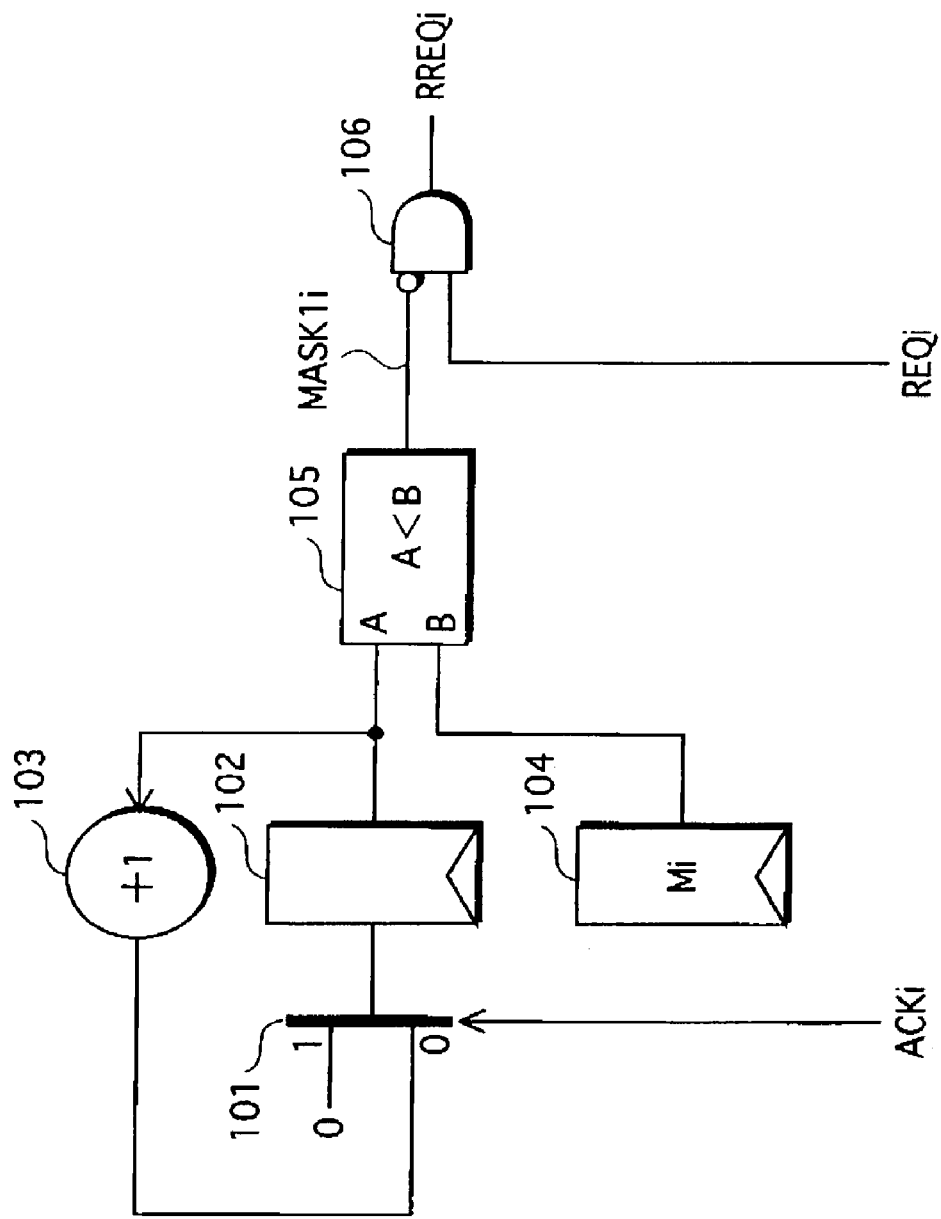
FIG. 3 is a functional block diagram of a request masking unit.

FIG. 3 is a functional block diagram illustrating a practical example of a construction of the request masking units 50 and 51. As shown in this drawing, the request masking units 50 and 51 each comprise a selector 101, a register 102, an adder 103, a register 104, a comparator 105, and a gate 106. A subscript "i" to the signal names in the drawing indicates a different value that each request masking unit holds to identify each signal. The explanation below is made by taking an example of the request masking unit 50 and the subscript "i" being 0.

The register 102 synchronizes with the arbitration clocks signal, which are not shown in the drawing, and latches an output signal from the selector 101. The register 102, the selector 101, and the adder 103 are counters to count a number of time-slots in which the acknowledging signal ACK0 is negated successively after the counter is reset to 0 when the acknowledging signal ACK0 is asserted.

The register 104 obtains and stores a number M0 in advance as a number of the time-slots in which the memory access requesting signal REQ0 is to be masked after the acknowledging signal ACK0 is asserted. The comparator 105 asserts the masking signal MASK10 when the number of the time-slots counted by the register 102 is smaller than M0 stored in the register 104.

The gate 106 transmits the memory access requesting signal REQ0 as the gated requesting signal RREQ0 in the time-slot in which the masking signal MASK10 is negated, and masks the memory access requesting signal REQ0 and does not transmit as the gated requesting signal RREQ0 in the time-slot in which the masking signal MASK10 is asserted.

With the above construction, the request masking unit 50 masks the memory access requesting signal REQ0 during the successive (M0+1) time-slots when the memory access requesting signal REQ0 is issued for a second time and after, and therefore the number of time-slots in which the memory access requesting signal REQ0 is transmitted as the gated requesting signal RREQ0 is one per (M0+1) time-slots. This ratio is hereinafter referred to as an active slot ratio, and described as 1/(M0+1) in this case.

Therefore, by selecting the number M0 so that the memory access requesting unit 80 obtains a necessary data transfer rate according to the gated requesting signal that the request masking unit 50 transmits in the active slot ratio 1/(M0+1), the memory access requesting unit 80 obtains the necessary data transfer rate, and other memory access requests are ensured to be acknowledged in remaining time-slots.

Further, by selecting a number M1 so that the memory access requesting unit 81 obtains a necessary data transfer rate according to the gated requesting signal that the request masking unit 51 transmits in the active slot ratio 1/(M1+1), it is ensured that the memory access requesting unit 81 also obtains the necessary data transfer rate, and other memory access requests are acknowledged in remaining time-slots.

As a result, the data transfer rate that each of the memory access requesting units requests is ensured according to the gated requesting signals, unless the total amount of the data transfer rate requested by each of the memory access requesting units exceeds the maximum data transfer rate of the shared memory.

Furthermore, by the above operation, the request masking unit 50 does not need to know status of either the request masking unit 51 or the memory access requesting unit 81, and the request masking unit 51 does not need to know status of either the request masking unit 50 or the memory access requesting unit 80.

In addition, it is clear that, even in a case in which the apparatus according to the present invention includes more than two request masking units having the above described construction, the same effect is obtained by each performing an independent operation.

[Detailed Construction of the Arbitrating Unit]

Figure 4:
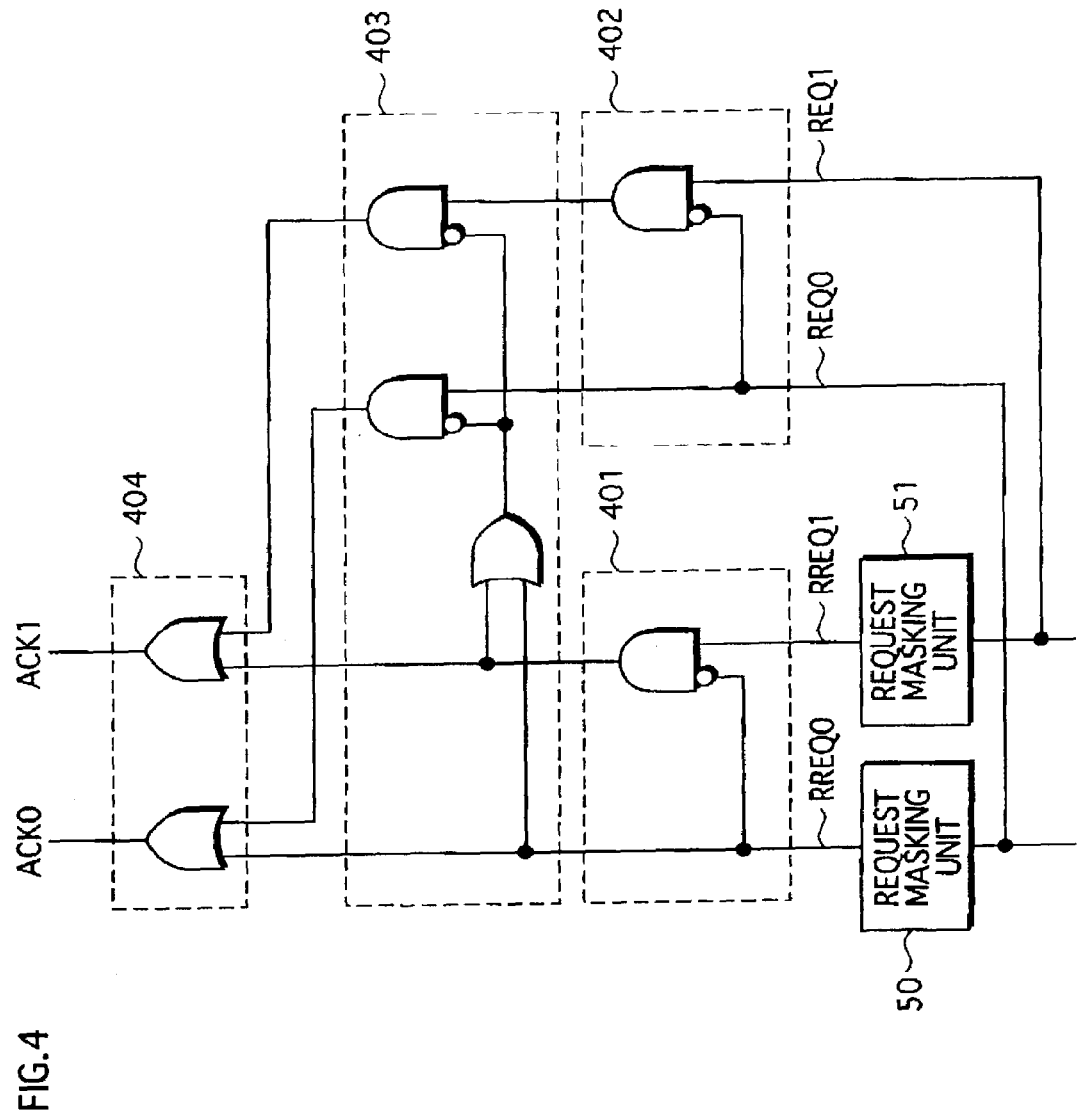
FIG. 4 is a functional block diagram of an arbitrating unit.

FIG. 4 is a functional block diagram illustrating an example of a construction of an arbitrating uni 40. The drawing also shows the request masking units 50 and 51 in order to make an explanation easier.

The arbitrating unit 40 comprises priority-based arbiters 401 and 402, and acknowledgement result selecting circuits 403 and 404.

The priority-based arbiter 401 is a very simple arbiter which always acknowledges the gated requesting signal RREQ0 with a higher priority than the gated requesting signal RREQ1. The priority is static and is not re-arranged dynamically.

The priority-based arbiter 402 is also a very simple arbiter which always acknowledges the memory access requesting signal REQ0 with a higher priority than the memory access requesting signal REQ1. The priority is static and is not re-arranged dynamically.

The acknowledgement result selecting circuits 403 and 404 output either of the acknowledgement results of the priority-based arbiters 401 and 402 as the acknowledging signals ACK0 and ACK1 by giving a higher priority to the acknowledgement result of the priority-based arbiter 401.

As has been described, by controlling the active slot ratio individually, necessary data transfer rate is always given to each of the memory access requesting units, and by simply outputting the acknowledgement result of the priority-based arbiters 401 as the acknowledging signals ACK0 and ACK1, an arbitration that ensures the data transfer rate for each of the memory access requesting units is achieved. Accordingly, the arbitrating unit 40 may include only the priority-based arbiter 401.

The rest of the circuit of the arbiter 40 is provided in order to avoid a problem that the total amount of the data transfer rate that can be distributed to each of the memory access requesting units reduces. This problem is caused because the acknowledging signals are not asserted due to the gated requesting signals not being transmitted to the priority-based arbiter 401 in a time-slot in which all the memory access requesting signals are masked.

This problem is avoided in a following manner. In a time-slot in which all memory access requesting signals are masked, the priority-based arbiter 402 acknowledges one of the memory access requesting signals regardless of the masking signal, and the acknowledgement result selecting circuits 403 and 404 output the acknowledgement result as the acknowledging signal ACK0 and ACK1.

Although the explanation here is made taking an example of the arbitrating unit 40 processing two memory access requesting signals and two gated requesting signals, it can be easily expanded to being able to process P(3≦P) memory access requesting signals and P(3≦P) gated requesting signals.

In this case, the effect of the present invention can be achieved by the priority-based arbiters 401 and 402 each structured by (P−1) number of gates that are closed by a signal that has a higher priority, the acknowledging signal selecting circuit 403 is structured by P of gates that are closed when the priority-based arbiter 401 asserts the acknowledging signal, and the acknowledging signal selecting circuit 404 is structured by P of OR gates.

[Operation of Resource Requesting Arbitration Apparatus 1]

Figure 5:
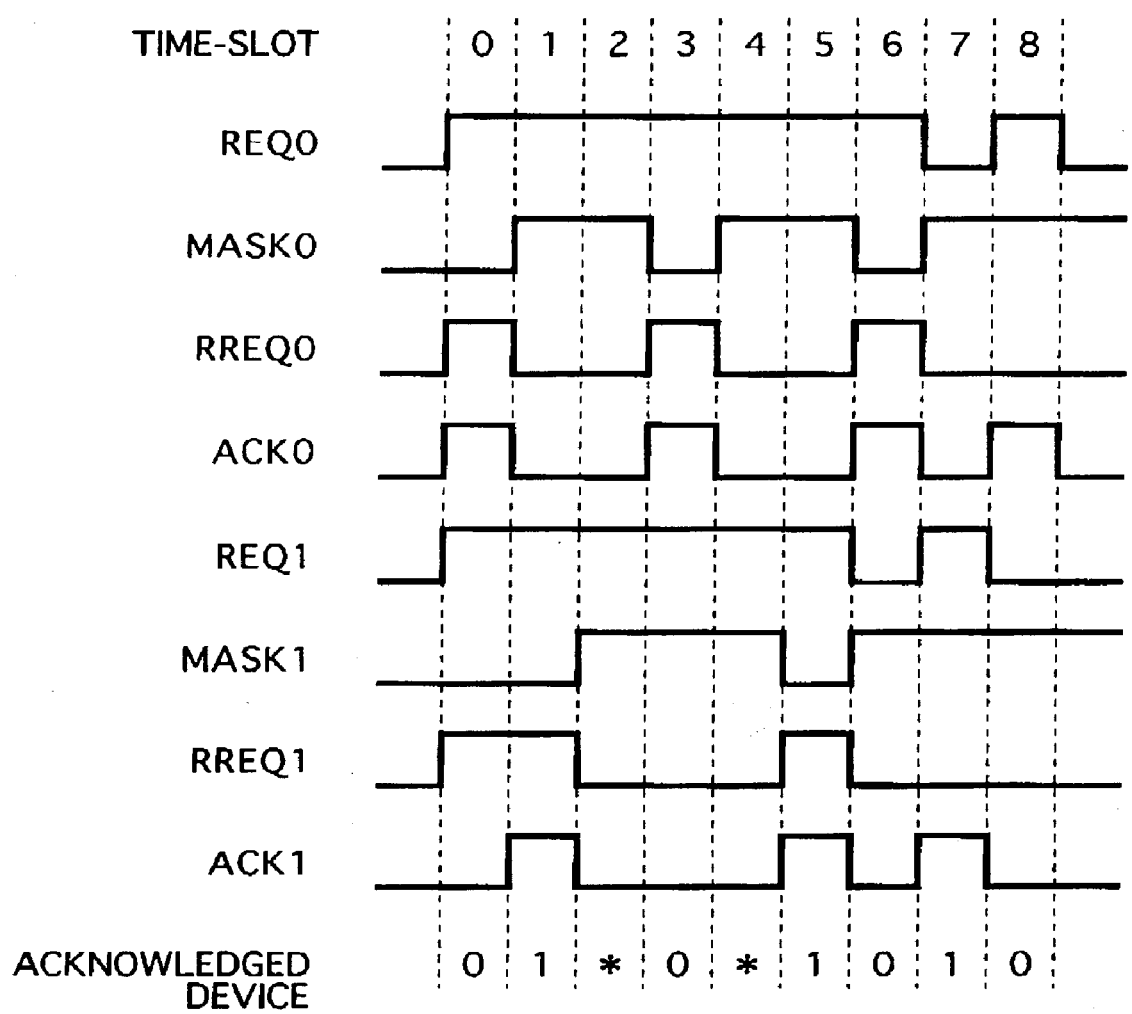
FIG. 5 is a chart showing an operational timing of the resource request arbitration apparatus.

FIG. 5 is a chart showing an operational timing indicating shift of time of major signals of an apparatus of resource requesting arbitration 1. With reference to this timing chart, operations in main time-slots are explained.

An example here is such that a memory access requesting unit having a lower priority that is now shown in the drawing, the number M0 is 2 so that the memory access requesting unit 80 obtains the necessary data transfer rate, the MASK0 is asserted successively to the ACK0 during 2 time-slots, the number M1 is 3 so that the memory access requesting unit 81 obtains the necessary data transfer rate, and MASK1 is asserted successively to the ACK1 during 3 time-slots.

In the time-slot 0 (hereinafter referred to as T0), REQ0 and REQ1 are asserted and not masked, RREQ0 is acknowledged and ACK0 is asserted. By asserting ACK0, MASK0 is asserted from T1 through T2.

In T1, REQ0 and REQ1 are asserted and REQ0 is masked, and RREQ1 is acknowledged and ACK1 is asserted. By asserting ACK1, MASK1 is asserted from T2 through T4.

In T2, REQ0 and REQ1 are asserted and both REQ0 and REQ1 are masked. The lower memory access requesting unit, which is not shown in the drawing asserts REQ*, and if REQ* is not masked, the REQ* is acknowledged.

In T3, REQ0 and REQ1 are asserted and MASK0 is negated. Therefore RREQ0 is again acknowledged.

The operations shown in the above time-slots are such that, by masking the memory access requests from each of the memory access requesting units in the time-slot in which the memory access requests exceeds the active slot ratio, the memory access request from the another memory accessing unit is acknowledged unfailingly.

In T7, REQ0 is negated and REQ1 is asserted while REQ1 is masked here, REQ1 is acknowledged and ACK1 is asserted, when REQ* from the lower memory access requesting unit is either negated or masked.

In T8, REQ0 is asserted and REQ1 is negated. While REQ0 is masked here, when a case is the same as in T7, REQ0 is acknowledged and ACK0 is asserted.

The operations shown in the above time-slots are such that, in a case all the memory access requests that are asserted are masked, by acknowledging one of the memory access requests that are asserted, decrease in the data transfer rate which can be distributed due to a low activity ratio is avoided.

[Examples of Other Constructions of Request Masking Unit]

Figure 6:
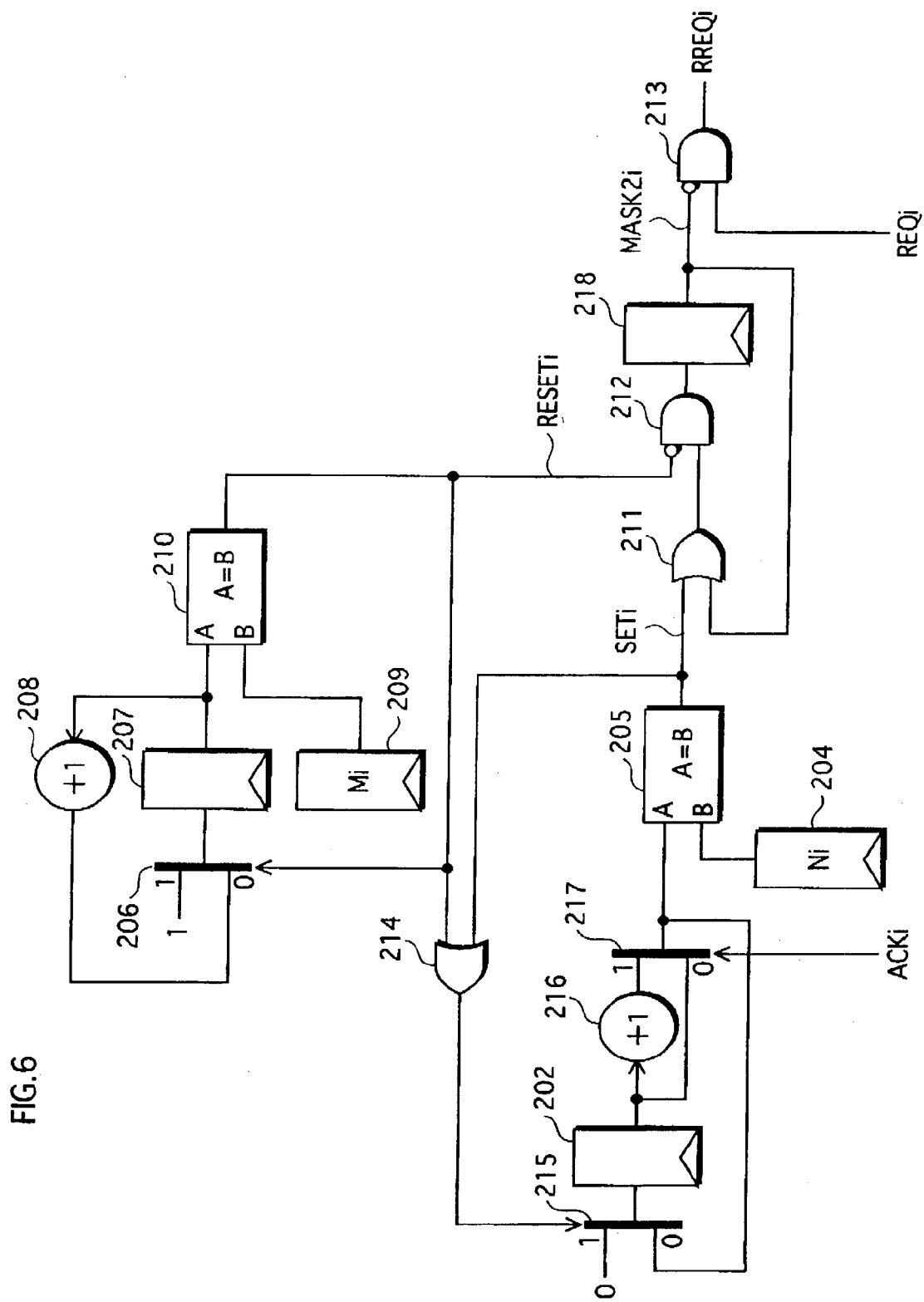
FIG. 6 is a functional block diagram of another example of the request masking unit.

FIG. 6 is a functional block diagram illustrating another example of the request masking units 50 ad 51. FIG. 6 is shown in the same way as in FIG. 3 and an explanation is not given here to avoid redundancy.

In this example, the request masking unit 50 comprises a first counter that asserts a resetting signal RESET0 once in M0 time-slots, a second counter that counts a number of time-slots in which the acknowledging signal ACK0 is asserted during M0 time-slots and asserts a setting signal SET0 when the counter value becomes N0, a flip-flop unit that asserts a masking signal MASK20 when the setting signal SET0 is asserted and negates the masking signal MASK20 when the resetting signal RESET0 is asserted, and a gate that masks the memory access requesting signal REQ0 according to the masking signal MASK20.

In FIG. 6, the first counter includes a register 207, a selector 206, an adder 208, a comparator 210, and a register 209. The second counter includes a gate 214, an adder 216, a selector 217, a selector 215, a register 202, a register 204, and a comparator 205. The flip-flop unit includes a register 218, a gate 211 and a gate 212.

The request masking unit 50 having the above construction masks the memory access requesting signal REQ0 during the successive M0 time-slots, after a (N0+1)th memory access requesting signal REQ0 is issued. The active slot ratio is controlled to be N0/M0.

Therefore, by selecting the number M0 and N0 so as to give the memory access requesting unit 80 the necessary data transfer rate according to the gated requesting signal that the request masking unit 50 transmits in the active slot ratio N0/M0, it is ensured that the memory access requesting unit 80 also obtains the necessary data transfer rate, and other memory access requests are acknowledged in remaining time-slots.

Figure 7:
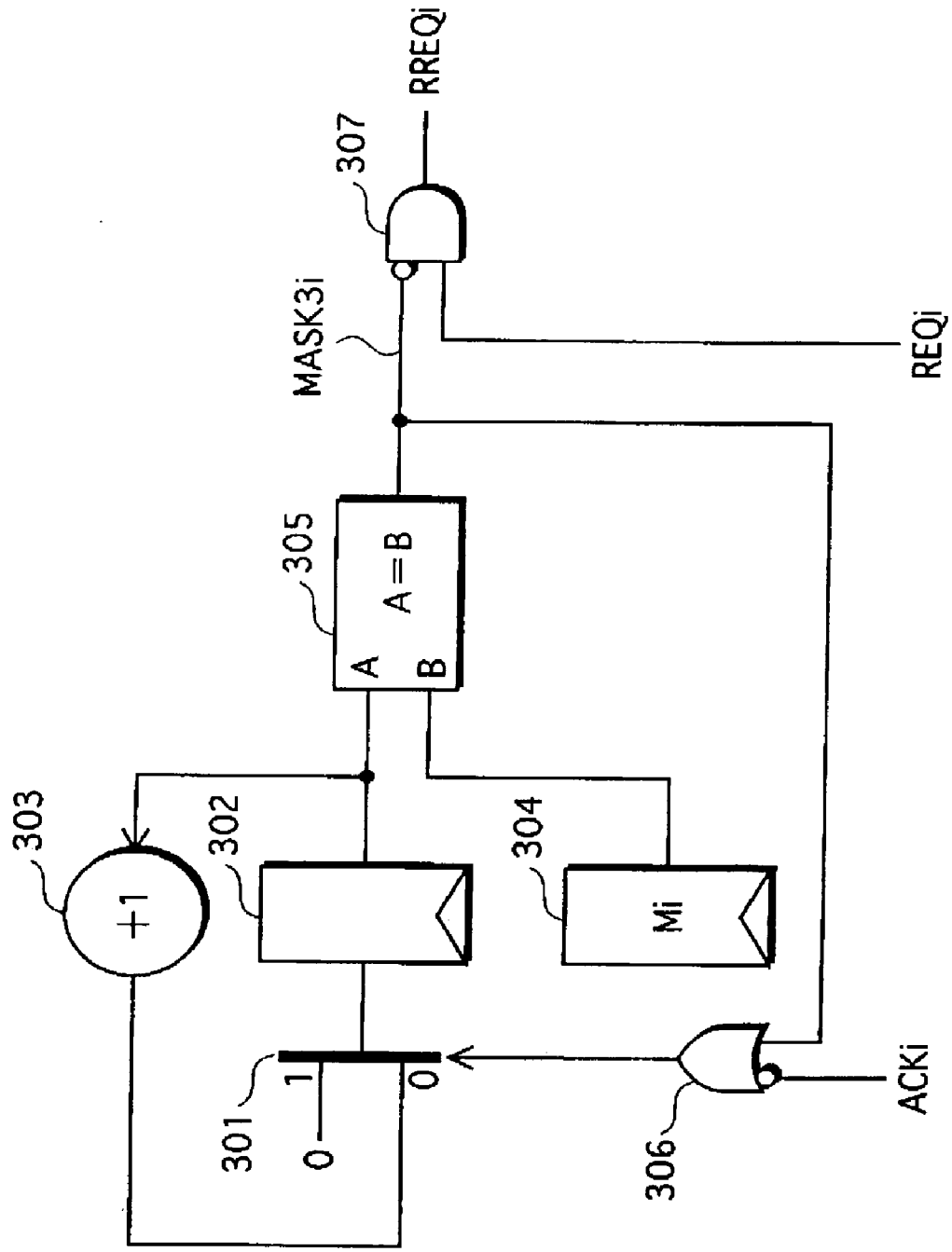
FIG. 7 is a functional block diagram of another example of the request masking unit.

FIG. 7 is a functional block diagram further illustrating another example of the request masking unit 50. In the request masking unit 50 of this example, a selector 301, a register 302, an adder 303, and a gate 306 count the number of time-slots in which the acknowledging signal ACK0 is asserted successively. The count is reset to 0 in a succeeding time-slot, when either of cases in which the acknowledging signal ACK0 is negated or in which the count value reaches to Mi.

A comparator 305 negates a masking signal MASK30 only in a time-slot in which the counter value reaches M0, and asserts the masking signal MASK30 in the remaining slot times. The gate 307 masks the memory access requesting signal REQ0 according to the masking signal MASK30.

The request masking units having the above construction masks the memory access requesting signal REQ0 that is issued during the successive (M0+1) time-slots. The active slot ratio is controlled to be (M0/M0+1).

Therefore, by selecting the number M0 so as to give the memory access requesting unit 80 a necessary data transfer rate according to the gated requesting signal that the request masking unit 50 transmits in the active slot ratio (M0/M0+1), it is ensured that the memory access requesting unit 80 also obtains the necessary data transfer rate, and other memory access requests are acknowledged in remaining time-slots.

All request masking units may have the same construction as one of constructions shown in FIG. 3, FIG. 6, and FIG. 7. In addition, each of the request masking units may have a different construction, respectively.

Note the following points. The request masking unit structured with M0 being 1 in the FIG. 3 controls the active slot ratio in 1/2, and the request masking unit structured with M0 being 10 and N0 being 5 in the FIG. 6 controls the active slot ratio in 5/10. Both of the above request masking units controls so that the half of time-slots are used. However, the latter example does not prevent that the time-slots up to 5 are used successively. This indicates that, although the lower memory access requesting unit might have to wait 5 successive time-slots when the latter request masking unit is applied to the upper memory access requesting unit having a higher priority, the number of time-slots in which the lower memory access requesting unit have to wait is reduced to 1 and the active slot ratio is maintained when the former request masking unit is applied.

[Conclusion]

As has been explained, in the resource request arbitration apparatus according to the first embodiment, each request masking unit masks the memory access requesting signal that exceeds the minimum number that the corresponding memory access requesting unit needs, and the arbitrating unit 40 acknowledges, based on the priority order set in advance, one of the memory access requesting signals that are not masked.

With the above resource request arbitration apparatus, the data transfer rate that each of the memory access requesting units needs is ensured, with using the priority order set in advance, and without concerning a relation among memory access requesting units other than the priority order.

Second Embodiment

The resource request arbitration apparatus according to a second embodiment is different from the resource request arbitration apparatus according to the first embodiment in that the apparatus of the second embodiment controls the maximum execution waiting time which indicates a period of time from issuing of a memory access command from each of the memory access requesting units through starting of execution of the memory access command.

[Outline]

Figure 8:
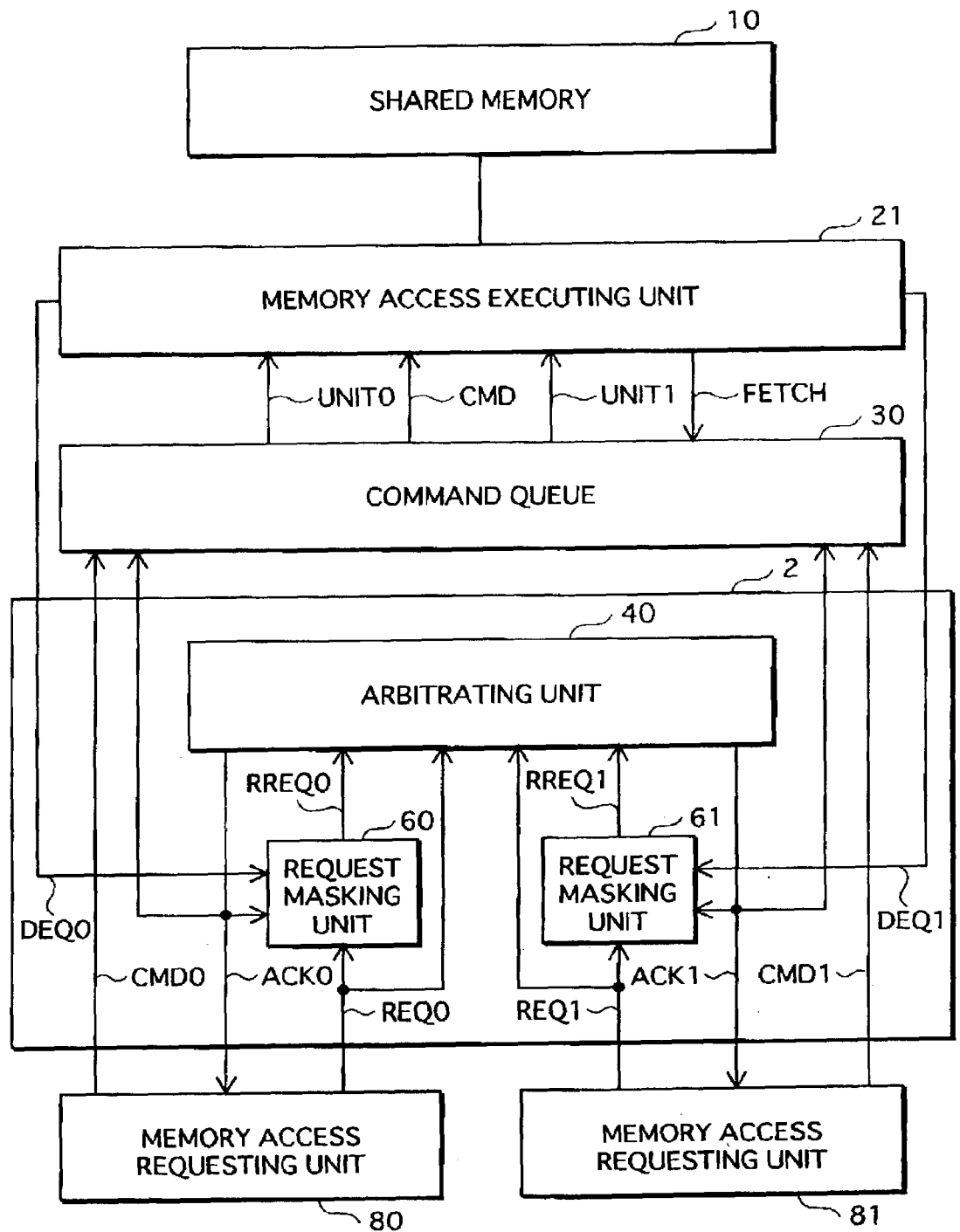
FIG. 8 is a functional block diagram of another example of the resource request arbitrating apparatus.

FIG. 8 is a functional block diagram illustrating a construction of a resource request arbitration apparatus 2 according to the second embodiment. In the drawing, memory access requesting units 80 and 81, a command queue 30, a memory access executing unit 21, and a shared memory 10 are shown in addition to the resource request arbitration apparatus 2. The elements included both in the first and the second embodiments are given the same reference numbers and are not explained here. An explanation below is given basically about differences from the first embodiment.

A memory access executing unit 21, when starting executing a memory access command CMD obtained, outputs obtained source identifying signal UNIT0 and UNIT1 as execution start notifying signals DEQ0 and DEQ1 respectively. The execution start notifying signals DEQ0 and DEQ1 are each issued by memory access requesting unit 80 or 81, and indicates that a number of memory access command held in the command queue 30 reduced by one.

[Detailed Construction of Request Masking Unit 60]

A request masking unit 60 transmits a memory access requesting signal REQ0 that is issued by the memory access requesting unit 80 as a gated requesting signal RREQ0, either when a number of memory accessing command that are issued by the memory access requesting unit 80 and held in the command queue 30 is a first number or less, or when no memory access command that is issued by the memory access requesting unit 80 and held in the command queue 30. When either of the above is not the case, the request masking unit 60 masks the memory access requesting signal REQ0 that is issued by the memory access requesting unit 80 and does not transmit the REQ0 as the gated requesting signal RREQ0.

Figure 9:
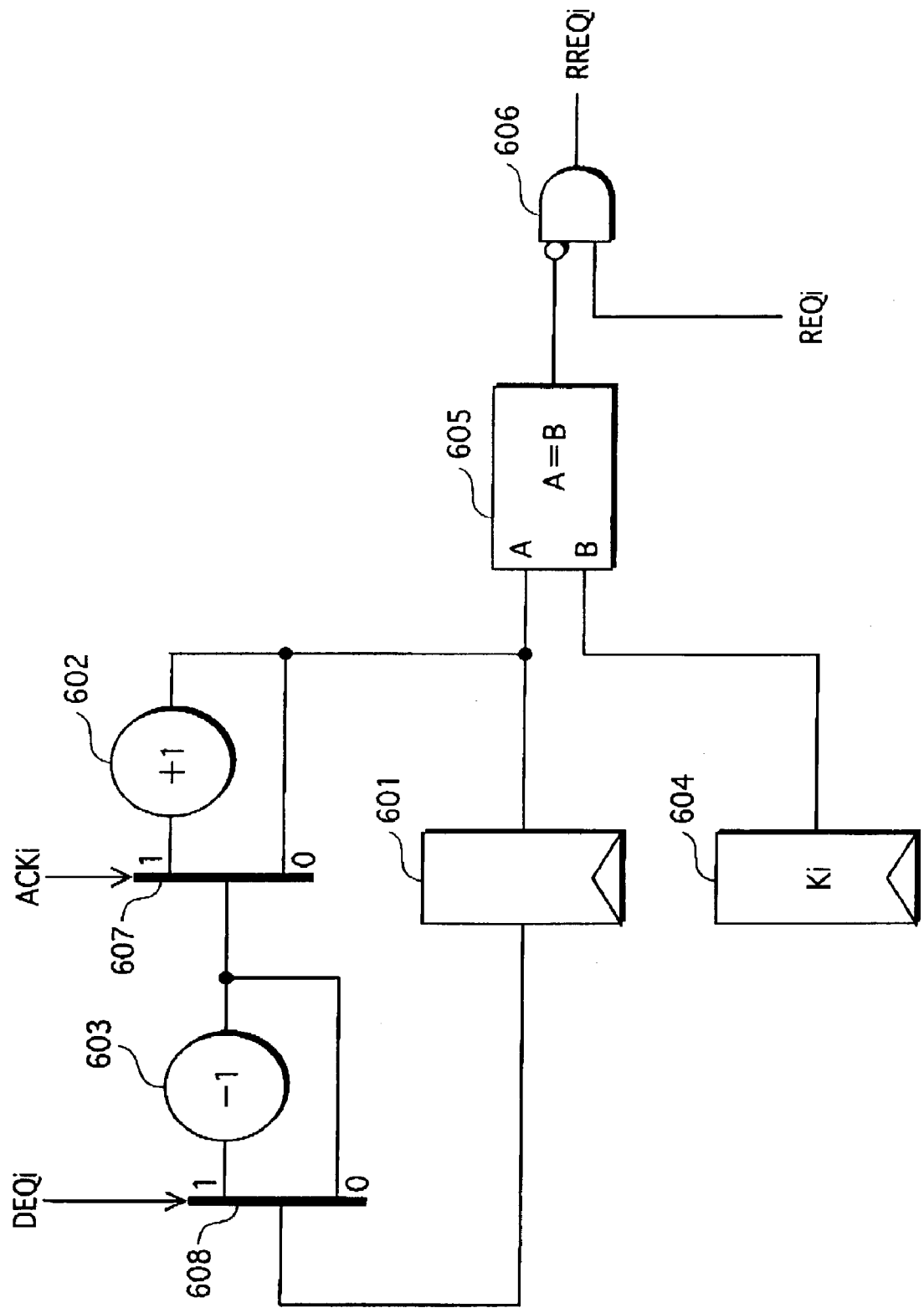
FIG. 9 is a functional block diagram of another example of the request masking unit.

FIG. 9 is a functional block diagram illustrating an example of a construction of the request masking unit 60.

A counter for adding a number of time-slots in which ACK0 is asserted and for subtracting a number of time-slots in which DEQ0 is asserted comprises a register 601, an adder 602, a selector 607, a subtracter 603, and a selector 608. Given that the default value of the register 601 is 0, the register 601 indicates the number of commands that are issued by the memory access requesting unit 80 and held by the command queue 30.

Concerning the number of commands that are issued by the memory access requesting unit 80 and held by the command queue 30, the register 604 obtains and stores a maximum number K0 that is used to avoid masking the memory access requesting signal REQ0, in advance.

The comparator 605 asserts a masking signal MASK40 in a time-slot in which the number counted by the register 601 becomes equal to the number stored in the register 604, and the gate 606 masks the memory access requesting signal REQ0 in response to the masking signal MASK40.

With the above construction, the request masking unit 60 restricts the number of memory access commands, which are issued by the memory access requesting unit 80 and held by the command queue 30, up to the number K0.

Accordingly, it is ensured that the maximum length of time due to the memory access commands that are issued by the memory access requesting unit 80 and held by the command queue 30 that other memory access commands ready and waiting have to wait till execution starts is (K0×t0), when t0 is a maximum execution time of the memory access command issued by the memory access requesting unit 80.

According to the above construction, a maximum length of time per every memory access requesting unit, during which a newly issued memory access command is put on hold till execution due to the memory access command issued by the corresponding memory access requesting unit, is ensured. Therefore, it is ensured that a summation of the maximum numbers of each memory access requesting unit equals to a maximum length of waiting time for memory access command for starting execution.

[Conclusion]

As has been explained, in the resource request arbitration apparatus according to the second embodiment, each request masking unit masks a new memory access requesting signal from the corresponding memory access requesting unit during a period in which a predetermined number of memory access commands that are issued by the corresponding memory access requesting unit are yet to be executed, and thus the maximum length of time that the memory access command waits before execution is ensured.

According to the above resource request arbitration apparatus, it is possible to ensure the maximum length of waiting time for execution of the memory access command issued by each memory access unit by using the predetermined priority order, and without concerning the relation among memory access units other than the priority order.

Third Embodiment

A resource request arbitration apparatus according to a third embodiment splits a memory access command, which is issued by each memory access requesting unit and that requests a resource exceeding a predetermined amount of resource, into a plurality of split memory access commands each requesting a resource smaller than the predetermined amount of resource. The resource request arbitration apparatus according to the third embodiment is different from the resource request arbitration apparatus according to the first embodiment in that both the memory access commands that are not split and split memory access commands generated by splitting are subject to arbitration.

[Entire Construction]

Figure 10:
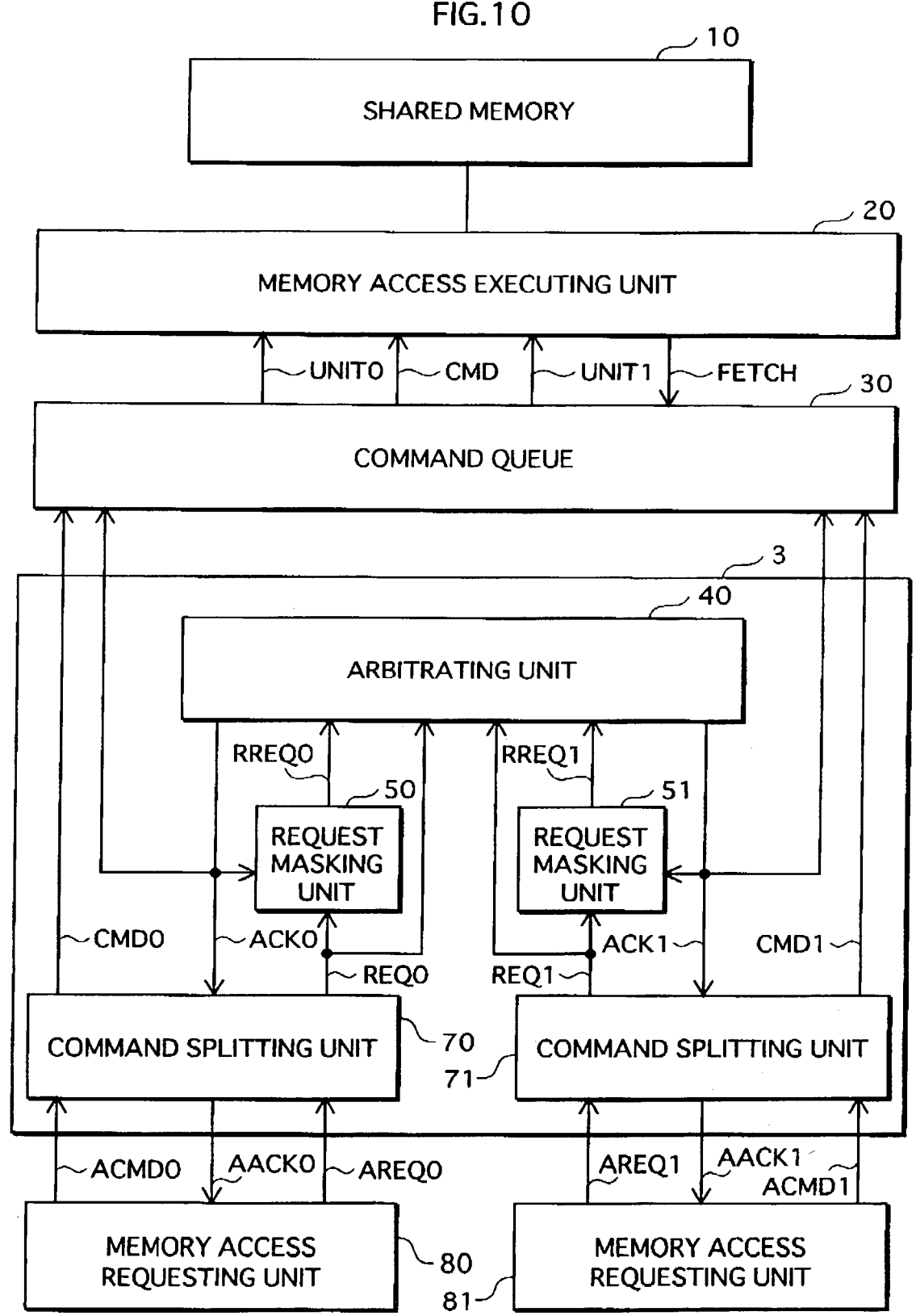
FIG. 10 is a functional block diagram of another example of the resource request arbitrating apparatus.

FIG. 10 is a functional block diagram illustrating a construction of the resource request arbitration apparatus 3 according to the third embodiment. In the drawing, memory access requesting units 80 and 81, a command queue 30, a memory access executing unit 20, and a shared memory 10 are shown in addition to the resource request arbitration apparatus 3. The elements included both in the first and the second embodiments are given the same reference numbers and are not explained here. An explanation below is given basically about differences from the first embodiment.

The resource request arbitration apparatus 3 has such a construction that the resource request arbitration apparatus 1 further includes command splitting units 70 and 71. The command splitting units 70 and 71 each are provided corresponding to the memory access requesting units 80 and 81.

The memory access requesting units 80 and 81 issue memory access command ACMD0 and ACMD1 to the command splitting units 70 and 71 respectively as needed, and asserts memory access requesting signals AREC0 and AREC1, respectively.

The command splitting unit 70 splits the memory access command ACMD0 obtained from the memory access requesting unit 80 into memory access commands CMD0 each requesting resource of a predetermined amount or smaller, and asserts a memory access requesting signal REQ0 for each of the memory access commands CMD0 that are generated by the splitting. When acknowledging signals ACK0 are asserted to all of the memory access requesting signal REQ0, an acknowledging signal AACK0 is asserted to the memory access requesting unit 80.

[Detail of Command Splitting Unit 70]

Figure 11:
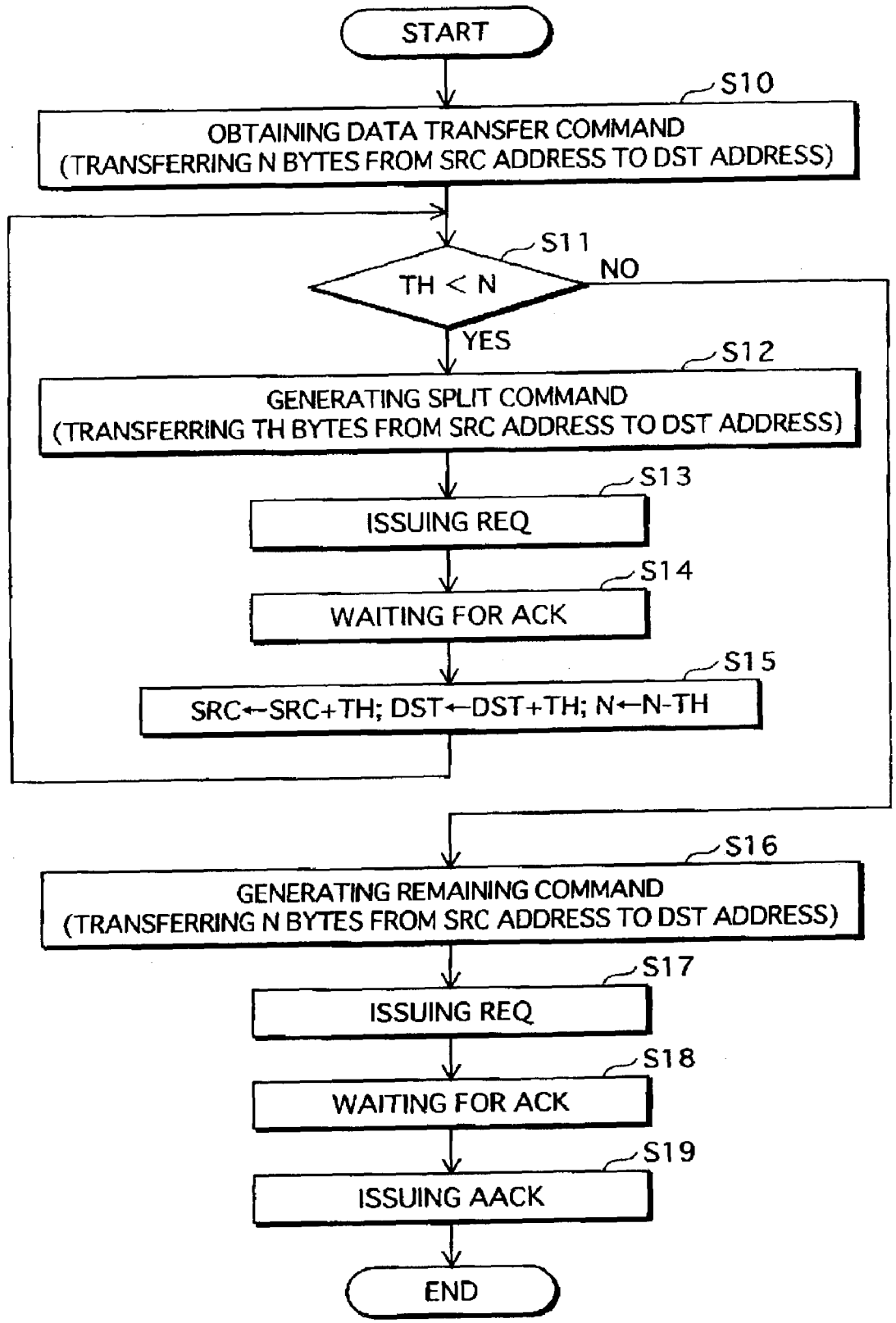
FIG. 11 is a flow chart showing an operation of a command splitting unit.

FIG. 11 is a flow chart showing an operation performed by the command splitting unit 70. An explanation is given to an example taking the memory access command ACMD0 and a data transfer command as one type of ACMD1. Note that the data transfer command refers to a command that commands to transfer data indicating a transfer source address SRC, a transfer destination address DST, and a number of transfer bytes N.

The command splitting unit 70 obtains the data transfer command from the memory access requesting unit 80 (S10).

When the number of transfer bytes N of the data is larger than a predetermined threshold value TH (S11:YES), the command splitting unit 70 generates the data transfer command for commanding to transfer the threshold value TH bytes of the data (S:12), asserts REQ0 (S13), waits for ACK0 being asserted (S14), and then renew the transfer source address SRC, the transfer destination address DST, and the number of transfer bytes N, and excludes the data which the data transfer command has been issued (S15), and repeats the command splitting operation from S11.

When the number of transfer bytes N of the data is the predetermined threshold value TH or smaller (S11:NO), the command splitting unit 70 generates the data transfer command for commanding to transfer the data (S16), asserts REQ0 (S17), waits for ACK0 being asserted (S18), and then asserts AACK0 (S19).

The command splitting unit 71 performs the same operation to the memory access requesting unit 81.

[Conclusion]

As has been explained, by applying the resource request arbitration apparatus according to the third embodiment, when the memory access commands ACMD0 and ACMD1 command to transfer the data whose size is larger than the threshold value, the memory access command is split into the plurality of memory access commands each commanding to transfer the data whose size is equal to or smaller than the threshold value. Therefore, it is possible to reduce the max waiting time for the execution of the memory access command.

[Modified Examples]

Although the present invention has been explained with reference to the above embodiments, the present invention is not restricted to the above embodiments, and the examples below are also included in the present invention.

The present invention can be an apparatus for resource requesting arbitration using a new masking signal generated by combining masking signals explained in the above embodiments. Further, the present invention also can be a method including processing steps executed by the resource requesting arbitration apparatus explained in each embodiment. The method can be a computer program executed by a computer system, and digital signals indicating the computer program.

The present invention also can be a computer readable storage medium that stores the program or the digital signals. Examples of the computer readable storage medium include a flexible disc, a hard disk, a CD, a MO, and a semiconductor memory.

The present invention also can be the computer program or the digital signals that are transmitted via a telecommunication circuit, wireless or wired connections, or a network as typified by the Internet, and the like.

Further, the present invention can be such that the computer program or the digital signals that are transmitted to an independent computer system, via the storage medium that stores the computer program or the digital signals, or via the Internet, and executed in an independent computer system.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. An apparatus for resource request arbitration that arbitrates a plurality of resource requests issued by a plurality of resource requesting devices by acknowledging one of the plurality of resource requests in every time-slot, the plurality of resource requesting devices being in a predetermined priority order, the apparatus for resource request arbitration comprising:

a judging unit operable to judge whether R resource requests issued by a resource requesting device have been acknowledged during preceding S time slots, R and S being numbers set to each of the plurality of resource requesting devices in advance;

a suspending unit operable to suspend a resource request issued by the resource requesting device when the judging unit judges positively; and an acknowledging unit operable to acknowledge a resource request selected from the resource requests that are not suspended by the suspending unit, the selected resource request being issued by a resource requesting device having a highest priority among the plurality of resource requesting devices which have issued the resource requests that are not suspended.

2. An apparatus for resource request arbitration according to claim 1, wherein, when the suspending unit suspends all of the resource requests issued by the plurality of resource requesting devices, the acknowledging unit acknowledges one of the suspended resource requests that is issued by a resource requesting device having a highest priority among the plurality of resource requesting devices that have issued the resource requests.

3. An apparatus for resource request arbitration according to claim 1, wherein the suspending unit includes a plurality of sets of a parameter storing unit and a masking signal issuing unit, each set corresponding to a different one of the plurality of resource requesting devices, the parameter storing unit storing a number M, the masking signal issuing unit operable to issue a masking signal during M time-slots succeeding to a time-slot in which the resource request issued by the corresponding resource requesting device is acknowledged, and wherein the suspending unit suspends the resource request that the corresponding resource requesting device issues at a second time and later, using the masking signal, during (M+1) successive time-slots.

4. An apparatus for resource request arbitration according to claim 1, wherein the suspending unit includes a plurality of sets of a parameter storing unit and a masking signal issuing unit, each set corresponding to a different one of the plurality of resource requesting devices, the parameter storing unit storing a number M and a number N, the masking signal issuing unit operable to issue a masking signal in every time-slot after M resource requests that are issued by the corresponding resource requesting device have been acknowledged within N successive time-slots, and wherein the suspending unit suspends the resource request that the corresponding resource requesting device issues the resource request at Mth time and later, using the masking signals, during N successive time-slots.

5. An apparatus for resource request arbitration according to claim 1, wherein the suspending unit includes a plurality of sets of a parameter storing unit and a masking signal issuing unit, each set corresponding to a different one of the plurality of resource requesting devices, the parameter storing unit storing a number M, the masking signal issuing unit operable to issue a masking signal in one succeeding time-slot after M resource requests that are issued by the corresponding resource requesting device have been acknowledged within successive time-slots, and wherein the suspending unit suspends a (M+1)th resource request issued by the corresponding resource requesting device during (M+1) successive time-slots using the masking signal.

6. An apparatus for resource request arbitration according to claim 1, wherein the suspending unit includes a plurality of sets of a parameter storing unit and a masking signal issuing unit, each set corresponding to a different one of the plurality of resource requesting devices, the parameter storing unit storing a number K, the masking signal issuing unit operable to issue a masking signal every time slot during time-slots, in which all of K resource requests that have been issued by the corresponding resource requesting device and have been acknowledged are yet to be executed, and wherein the suspending unit suspends the resource requests that the corresponding resource requesting device issues at a Kth time and later, using the masking signals, during the time-slots in which the K acknowledged resource requests are yet to be executed.

7. An apparatus for resource request arbitration according to claim 1, further including:

a resource request splitting unit operable to split the resource request that requests a resource exceeding a predetermined amount and is issued by a resource requesting device into a plurality of split resource requests each requesting the resource of the predetermined amount or smaller, wherein the suspending unit suspends the resource request and the split resource request issued by and originated from the resource requesting devices when total R of resource requests and split resource requests that are issued by and originated from the resource requesting device have already been acknowledged during preceding S time-slots, and the acknowledging unit acknowledges a resource request and a split resource request that are not suspended by the suspending unit, the resource request or the acknowledged split resource request to be acknowledged being issued by or originated from a resource requesting device having a highest priority among the plurality of resource requesting devices which have issued the resource requests and the split resource requests that are not suspended.

8. A method for resource request arbitration that arbitrates a plurality of resource requests issued by a plurality of resource requesting devices by acknowledging one of the plurality of resource requests in every time-slot, the plurality of resource requesting devices being in a predetermined priority order, the method for resource request arbitration comprising the step of:

judging whether R resource requests issued by a resource requesting device have been acknowledged during preceding S time slots, R and S being numbers set to each of the plurality of resource requesting devices in advance;

suspending a resource request issued by the resource requesting device when the judging step judges positively; and acknowledging a resource request selected from the resource requests that are not suspended in the suspending step, the selected resource request being issued by a resource requesting device having a highest priority among the plurality of resource requesting devices which have issued the resource requests that are not suspended.

9. A method for resource request arbitration according to claim 8, wherein, when all of the resource requests issued by the plurality of resource requesting devices is suspended in the suspending step, one of the suspended resource requests that is issued by a resource requesting device having a highest priority among the plurality of resource requesting devices that have issued the resource requests is acknowledged in the acknowledging step.

10. A method for resource request arbitration according to claim 8, wherein the suspending step includes a plurality of sets of a parameter storing substep and a masking signal issuing substep, each set corresponding to a different one of the plurality of resource requesting devices, the parameter obtaining substep for obtaining a number M, the masking signal issuing substep for issuing a masking signal during M time-slots succeeding to a time-slot in which the resource request issued by the corresponding resource requesting device is acknowledged, and wherein the resource request that the corresponding resource requesting device issues at a second time and later during (M+1) successive time-slots is suspended in the suspending step, using the masking signal.

11. A method for resource request arbitration according to claim 8, wherein the suspending step includes a plurality of sets of a parameter storing substep and a masking signal issuing substep, each set corresponding to a different one of the plurality of resource requesting devices, the parameter obtaining substep for obtaining a number M and a number N, the masking signal issuing subsep for issuing a masking signal in every time-slot after M resource requests that are issued by the corresponding resource requesting device have been acknowledged within N successive time-slots, and wherein the resource request that the corresponding resource requesting device issues the resource request at Mth time and later during N successive time-slots is suspended in the suspending unit, using the masking signals.

12. A method for resource request arbitration according to claim 8, wherein the suspending step includes a plurality of sets of a parameter storing substep and a masking signal issuing substep, each set corresponding to a different one of the plurality of resource requesting devices, the parameter obtaining substep for obtaining a number M, the masking signal issuing step for issuing a masking signal in one succeeding time-slot after M resource requests that are issued by the corresponding resource requesting device have been acknowledged within successive time-slots, and wherein a (M+1)th resource request issued by the corresponding resource requesting device during (M+1) successive time-slots is suspended in the suspending step using the masking signal.

13. A method for resource request arbitration according to claim 8, wherein the suspending step includes a plurality of sets of a parameter storing substep and a masking signal issuing substep, each set corresponding to a different one of the plurality of resource requesting devices, the parameter obtaining substep for obtaining a number K, the masking signal issuing unit issuing a masking signal every time slot during time-slots, in which all of K resource requests that have been issued by the corresponding resource requesting device and have been acknowledged are yet to be executed, and wherein the suspending unit suspends the resource requests that the corresponding resource requesting device issues at a Kth time and later, using the masking signals, during the time-slots in which the K acknowledged resource requests are yet to be executed.

14. A method for resource request arbitration according to claim 8, further including:

a resource request splitting step for splitting the resource request that requests a resource exceeding a predetermined amount and is issued by a resource requesting device into a plurality of split resource requests each requesting the resource of the predetermined amount or smaller, wherein the suspending step for suspending the resource request and the split resource request issued by and originated from the resource requesting devices when total R of resource requests and split resource requests that are issued by and originated from the resource requesting device have already been acknowledged during preceding S time-slots, and the acknowledging step for acknowledging a resource request and a split resource request that are not suspended in the suspending step, the resource request or the acknowledged split resource request to be acknowledged being issued by or originated from a resource requesting device having a highest priority among the plurality of resource requesting devices which have issued the resource requests and the split resource requests that are not suspended.

15. A machine-readable medium having one or more instructions for resource request arbitration which when executed by a set of processors causes the set of processors to perform operations comprising:

judging whether R resource requests issued by a resource requesting device have been acknowledged during preceding S time slots, R and S being numbers set to each of the plurality of resource requesting devices in advance;

suspending a resource request issued by the resource requesting device when; the judging step judges positively; and acknowledging a resource request selected from the resource requests that are not suspended in the suspending step, the selected resource request being issued by a resource requesting device having a highest priority among the plurality of resource requesting devices which have issued the resource requests that are not suspended.

16. The machine-readable instructions according to claim 15, wherein, when all of the resource requests issued by the plurality of resource requesting devices is suspended, one of the suspended resource requests that is issued by a resource requesting device having a highest priority among the plurality of resource requesting devices that have issued the resource requests is acknowledged.

17. The machine-readable instructions according to claim 15, wherein the suspending operation includes a plurality of sets of a parameter storing suboperations and a masking signal issuing substep suboperations executed by a computer, each set corresponding to a different one of the plurality of resource requesting devices, the parameter obtaining suboperations for obtaining a number M, the masking signal issuing suboperations for issuing a masking signal during M time-slots succeeding to a time-slot in which the resource request issued by the corresponding resource requesting device is acknowledged, and wherein the resource request that the corresponding resource requesting device issues at a second time and later during (M+1) successive time-slots is suspended, using the masking signal.

18. The machine-readable instructions according to claim 15, wherein the suspending operation includes a plurality of sets of a parameter storing suboperations and a masking signal issuing suboperations executed by a computer, each set corresponding to a different one of the plurality of resource requesting devices, the parameter obtaining suboperations for obtaining a number M and a number N, the masking signal issuing suboperations for issuing a masking signal in every time-slot after M resource requests that are issued by the corresponding resource requesting device have been acknowledged within N successive time-slots, and wherein the resource request that the corresponding resource requesting device issues the resource request at Mth time and later during N successive time-slots is suspended in the suspending unit, using the masking signals.

19. The machine-readable instructions according to claim 15, wherein the suspending operation includes a plurality of sets of a parameter storing suboperations and a masking signal issuing suboperations executed by a computer, each set corresponding to a different one of the plurality of resource requesting devices, the parameter obtaining suboperations for obtaining a number M, the masking signal issuing operation for issuing a masking signal in one succeeding time-slot after M resource requests that are issued by the corresponding resource requesting device have been acknowledged within successive time-slots, and wherein a (M+1)th resource request issued by the corresponding resource requesting device during (M+1) successive time-slots is suspended in the suspending operation using the masking signal.

20. The machine-readable instructions according to claim 15, wherein the suspending operation includes a plurality of sets of a parameter storing suboperations and a masking signal issuing suboperations executed by a computer, each set corresponding to a different one of the plurality of resource requesting devices, the masking signal issuing unit issuing a masking signal every time slot during time-slots, in which all of K resource requests that have been issued by the corresponding resource requesting device and have been acknowledged are yet to be executed, and wherein the suspending unit suspends the resource requests that the corresponding resource requesting device issues at a Kth time and later, using the masking signals, during the time-slots in which the K acknowledged resource requests are yet to be executed.

21. The machine-readable instructions according to claim 15, further comprising:

a resource request splitting operation for splitting the resource request that requests a resource exceeding a predetermined amount and is issued by a resource requesting device into a plurality of split resource requests, each requesting the resource of the predetermined amount or smaller, wherein the suspending operation for suspending the resource request and the split resource request issued by and originated from the resource requesting devices when total R of resource requests, and split resource requests that are issued by and originated from the resource requesting device have already been acknowledged during preceding S time-slots, and the acknowledging operation for acknowledging a resource request and a split resource request that are not suspended in the suspending step, the resource request or the acknowledged split resource request to be acknowledged being issued by or originated from a resource requesting device having a highest priority among the plurality of resource requesting devices which have issued the resource requests and the split resource requests that are not suspended.

* * * * *

UNITED STATES PATENT AND TRADEMARK OFFICE
CERTIFICATE OF CORRECTION

PATENT NO. : 7,007,138 B2 Page 1 of 1
APPLICATION NO. : 10/413758
DATED : February 28, 2006
INVENTOR(S) : Mochida et al.

It is certified that error appears in the above-identified patent and that said Letters Patent is hereby corrected as shown below:

In Claim 8, Column 19, line 16, "step" should be --steps--.
In Claim 17, Column 21, line 32, "substep" should be deleted.

Signed and Sealed this

Thirtieth Day of January, 2007

JON W. DUDAS
*Director of the United States Patent and Trademark Office*